(12) United States Patent
Kleemeier (10) Patent No.: US 7,522,059 B1
(45) Date of Patent: Apr. 21, 2009

(54) HANDHELD RFID READER

(76) Inventor: Robert Kleemeier, 1324 W. Clairemont Ave., Eau Claire, WI (US) 54701

(*) Notice: Subject to any disclaimer, the term of this patent is extended or adjusted under 35 U.S.C. 154(b) by 32 days.

(21) Appl. No.: 11/300,177

(22) Filed: Dec. 14, 2005

Related U.S. Application Data (60) Provisional application No. 60/635,890, filed on Dec. 14, 2004.

(51) Int. Cl.
*G08B 23/00* (2006.01)

(52) U.S. Cl. ............... 340/573.3; 340/572.1; 340/573.1

(58) Field of Classification Search ............... 340/572.1, 340/572.3, 572.4, 568.1, 505, 539.1, 539.11, 340/539.19, 539.22, 10.1, 573.3, 573.4, 573.1; 199/51.02, 712

See application file for complete search history.

(56) References Cited

U.S. PATENT DOCUMENTS

| | | | | |
|---|---|---|---|---|
| 6,329,920 B1 * | 12/2001 | Morrison et al. | ......... | 340/573.3 |
| 6,342,839 B1 * | 1/2002 | Curkendall et al. | ...... | 340/573.3 |
| 6,346,885 B1 * | 2/2002 | Curkendall | ............. | 340/572.4 |
| 6,664,897 B2 * | 12/2003 | Pape et al. | ............... | 340/573.3 |
| 6,878,052 B2 * | 4/2005 | Andersson | .................. | 452/149 |

* cited by examiner

*Primary Examiner*—Van T. Trieu
(74) *Attorney, Agent, or Firm*—D L Tschida (57) ABSTRACT

A data collection device (i.e. reader or reader/writer) for the animal husbandry industry that links to a database to accept instruction protocols for listed animals. An operator scans animals and reads data for each listed and/or located animal per pre-determined sets of instructions unique to each RFID. Read operations are confirmed with auditory, tactile and/or visual feedback. The acquired data and/or operator entries and comments are uploadable to the database. The data can also be collected and transferred over a real-time communication link.

15 Claims, 5 Drawing Sheets

Load "To Do List" or "Memory List" into memory of IMR
ISO-Cane Memory Reader
ISO-Lookup Reader
LightningROD Lookup Reader PC/PDA    Wireless Communication    IMR Transponder Reader

Read RFID Tags on Animals
Display when animal is Stored in Memory

IMR Operator Panel Layout
Showing Typical Display and Indicators

Display of Tag ID that has been read
When Animal is not in Memory

Load "To Do List" or "Memory List" into memory of IMR
ISO-Cane Memory Reader
ISO-Lookup Reader
LightningROD Lookup Reader PC/PDA     Wireless Communication     IMR Transponder Reader IMR Operator Panel Layout
Showing Typical Display and Indicators

Figure 1A

Read RFID Tags on Animals
Display when animal is Stored in Memory

Display of Tag ID that has been read
When Animal is not in Memory

Figure 1B

Return Completed
"Memory List" or "To Do List"
To Computer
For Analysis and Storage IMR Transponder Reader     Wireless Communication     PC/PDA Example of data downloaded
from the IMR memory to a PC/PDA (Data is in a comma delimited format; one line for each ID stored in memory)

HANDHELD RFID READER

RELATED APPLICATION DATA

Non-provisional of provisional application Ser. No. 60/635,890, filed Dec. 14, 2004.

BACKGROUND OF THE INVENTION

The present invention relates to animal identification systems and, in particular, to a system and equipment for reading and writing data stored on identification media worn by monitored animals.

There are several issues associated with the rapid adoption and use of radio frequency identification (RFID) tags and related technology in the animal husbandry industry. Many individuals believe that electronic readers are cumbersome and expensive technology, which is not readily suited to their normal workday functions.

Others dislike the need for wires and connectors joining multiple devices. Most are unable to envision what benefit accrues to them personally when they identify an animal with an electronic RFID tag.

There are two general ways in which dairymen and ranchers organize their work in animal agriculture.

Batch—Where every animal receives the same treatment and the treatment is so noted for the group.

Individual—Where individual animals are selected for a specific treatment from a group with individual record updates to be recorded for each animal.

My invention targets the way in which an RFID reader is used in performing both batch and individual operations with animals. The integrated memory reader (IMR) uses a programmed and integrated memory chip in a unique and highly functional manner to direct activities and to collect and store information associated with individual RFID tags affixed to each animal in an identified group of animals. Providing memory in the reader and using it in this unique manner empowers the user without the usual burden of requiring a nearby or linked computer in order to direct activities and collect data. Specific activities can now be performed without the expense and need for a sustained link with a computer. In fact the flow of information is toward the memory on the IMR instead of toward a computer, which is the usual direction for information to travel.

U.S. Pat. No. 6,342,839 (Curkendall) teaches the use of computers linked to an RFID reader by means of a wireless radio frequency connection at the time of a key animal event. The nature of the event to be signaled to the computer by reading an RFID tag associated with and signaling that event as well as the RFID tag on the animal which allows the computer to associate the action or actions being taken with the correct animal. Any action taken is then stored in the associated database for the animal or animals involved. This is well suited to an unknown group of animals that are presented in a batch for treatment or for measurement while the reader is linked to a computer.

The foregoing schema requires that a number of implements be in close proximity for rapid wireless data transfer and verification of action taken. In the examples cited by the patent, there is at the very least a laptop computer either tethered or wirelessly connected to an RFID reader so that the RFID reader is monitored and the data saved on the storage disk of the computer. For example, this circumstance can occur where an operator is working at chute side with a mobile scanning unit reading tags and interfacing wirelessly with a computer that is being signaled and guided by the reading of predefined RFID tags. Applicant and Curkendall previously used a similar technique to monitor RFID tags fastened to each end of a parlor to tell the computer which stall would be the next one read in order to place cows in specific stalls to record milk production. In the foregoing instances the RFID reader is principally a passive device that is used to collect RFID readings and relay them to a computer for processing thus requiring a link.

In distinction to known systems and devices, the subject invention provides an interactive functional memory. Associated programming enables interaction between the IMR and the operator such that a visual display gives the operator positive feedback for initiating and verifying his actions. Other readers need to be connected either wirelessly or via a cable to a computer while they are in an operating task oriented endeavor in order to enable the operator to do any more than perform a scan and save function that is typically performed by RFID readers.

In particular, the IMR:

A) Displays messages requiring operator action from previously downloaded instructions from a computer which prompt the operator to perform the tasked function with each specific animal.

B) Displays visible tag numbers (e.g. colored and numbered ear tags) that are cross referenced to each RFID number so the operator can verify that the correct animal is being serviced.

C) Displays preloaded services to be performed on each animal from its memory.

D) Accepts and displays operator input signaling task completion and outcome.

E) Multiple operator signals may be used including a separate task key or keys, multiple keying of one or several keys or just assigning RFFD task tags to be scanned by the reader. With additional memory the operator could give the IMR verbal commands or record responses to a task.

F) Any device with a serial, USB or other communications output port could be made into a wireless output and the response sent to the memory on the IMR from the device. This would include scales, digital thermometers, ultrasound units, milk-meters, etc.

F) Can accept keyboard input for an animal from a computer.

Thus the IMR acts as a data collector that can link to a computer database prior to its use in the field and afterward to upload the new data it has acquired. It can also be used in a continuous real-time wireless link with a computer, but it doesn't need to be so linked to be functional for the user.

The IMR with its unique task handling programming thus reverses the usual direction of information flow in field operations. It dramatically extends the functionality such that in many situations the operator no longer needs to carry a PDA, data phone or similar device having a supplementary keyboard and/or processing capabilities as an intermediary for interfacing with a main database. The IMR however is adapted for use with the foregoing types of devices where the expense and inconvenience of carrying and operating a second device is warranted.

SUMMARY OF THE INVENTION

It is a primary object of the present invention to provide a radio frequency reader or reader/writer for the animal husbandry industry.

It is a further object of the invention to provide a reader that is compatible with half and full duplex RFID tags worn by animals.

It is a further object of the invention to provide a reader that accepts the preloading of lists of RFID numbers and related operator instruction sets or protocols.

It is a further object of the invention to provide a reader that collects listed and unlisted data and is operative to write the data to a compatible herd database. It is a further object of the invention to provide a reader that is compatible with a variety of remote monitoring equipment/sensors (e.g. electronic scales, thermometers, ultrasound devices, etc.).

It is a further object of the invention to provide a portable reader that permits use while roaming amongst or near a collection of tagged animals and a subset of which comprise the stored list of animals to be read and identified.

It is a further object of the invention to provide a portable reader that confimis a successful read operation with auditory, tactile or visual enunciation without requiring operator viewing of a display.

The foregoing objects, advantages and distinctions of the invention, among others, are found in a handheld reader that is adapted to communicate with a computer containing a herd database and/or a personal digital assistant (PDA) device. The reader can take the form a cane-like instrument that can be carried and manipulated amongst a herd of animals. Predetermined lists of animals can be transferred to the reader for monitoring to defined instruction sets or protocols. Data is collected from RFID devices worn by the animals and/or external devices and the collected data is linked to the unique animal RFID numbers.

Still other objects, advantages and distinctions of the invention will become more apparent from the following description with respect to the appended drawings. Presently considered readers and operational system improvements or modifications are described as appropriate. The description should not be literally construed in limitation of the invention. Rather, the scope of the invention should be broadly interpreted within the scope of the further appended claims.

BRIEF DESCRIPTION OF THE DRAWINGS

Similar reference numerals and characters at the drawings refer to like structure at the various drawings, which are as follows.

DESCRIPTION OF THE PREFERRED EMBODIMENT

In an effort to simplify all aspects involved in the practical use of RFID readers and reader/writers in the workday world, the subject reader or reader/writer provides a device that is simple to use by following an "operator protocol" and requires a less cumbersome set of equipment to facilitate field operation. In a preferred embodiment of an RFID reader, the IMR comprises an active device that includes sufficient programmable memory and associated firmware coupled to an operator readable display and/or other enunciator device that signals and/or instructs the operator to take selective action upon reading a stored animal RFID.

In order to function in an active mode in the field, the IMR relies on its uniquely designed memory that has been preloaded from a database. In its present construction, the IMR is configured in the form of a cane or wand having indicator lights, an audible buzzer or vibrator and a 2-row LCD readout screen are used to provide information to the operator. The programmable memory on the IMR can be loaded with appropriate data via a suitable data link, such as a wireless, a wired or an IR link, to a computer database.

To simplify operation, the IMR, when it reads an RFID tag, is designed to access the IMR memory for an ID tag, to locate a short, pertinent operational instruction message for the operator. The operator is thereby able to work independently of a computer or any peripheral device as he/she complies with the variables and parameters of the instruction message for that particular animal and stores an outcome for the task. The operator can then transfer the readings or wait to until a later time to transfer the data.

Additional functionality can be obtained by connecting the reader to a PDA or a laptop computer by a variety of common communications links (e.g. hardwire, IR, wireless, BLUETOOTH). It can then utilize the functionality and diversity of a complete database. The reader, however, can function alone using the available on-board memory and integral display.

Any RFID tagged animals not appearing on a reader provided work list may be added to the computer database with interactive programming on a computer or PDA that is linked to the reader. In such instance, the PDA effectively provides a keyboard to enable the entry of additional alphanumeric information using standard data entry procedures. Many of the common field activities for animal maintenance do not require the overhead and complexity of a keyboard to function and gather information, which functions can be readily performed by the RFID reader as a data collector.

The subject wireless portable RFID reader is therefore preloaded with action prompts or tasking instructions, which typically appear on the LCD display and instruct the operator sufficiently so that he/she is able to carry out the specified tasks. The operator may also be signaled in other ways, such as by audible, visual and tactile means. It is to be understood that the operating protocol requires that the defined tasks are performed, as specified in the operator protocol, on all pre-designated animals located and read by the portable reader.

Data may be collected and stored on each animal by signaling the IMR in any of several ways after reading an RFID tag and identifying the animal (e.g. pushing an additional function button or reading function designated tags as in a barcode book of codes or through multiple quick pushes on the read button, among other operator actions).

If the portable reader and RFID tags have read/write capabilities, the IMR can place an encrypted description of each action taken or any other desired message onto the animal tag that has just been read. One such message could be the encrypted "site ID" of the premises on which the animal is located. By following a specific protocol, a considerable amount of information can be stored for each animal in such a distributed database. The database on each animal tag can also be structured such that each premise is recorded only one time without an intervening location. This provides nearly instantaneous trace-back and/or owner verification.

I. Operation

Figure 1A:
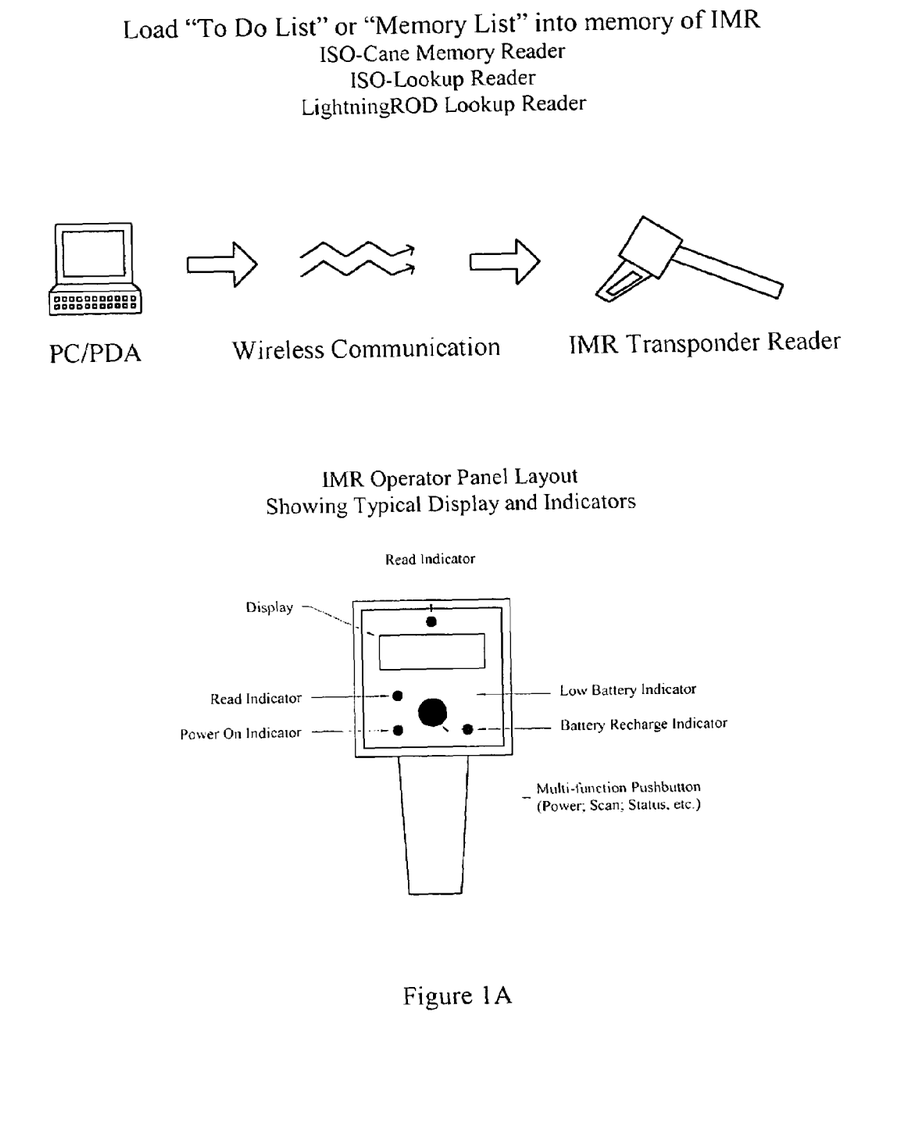
FIGS. 1A through 1E show a general flow chart to the steps performed by the IMR during normal read operations and a couple of variations thereof.
Figure 1B:
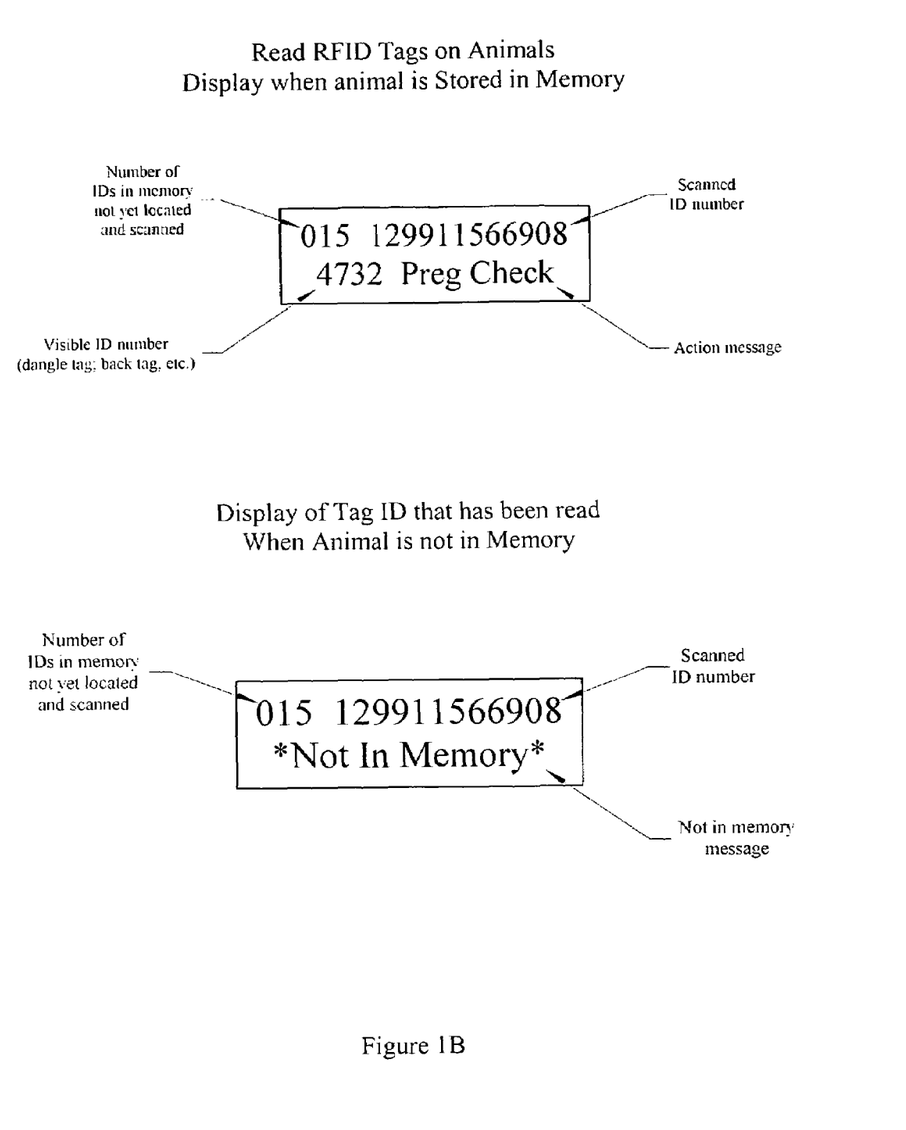
Figure 1C:
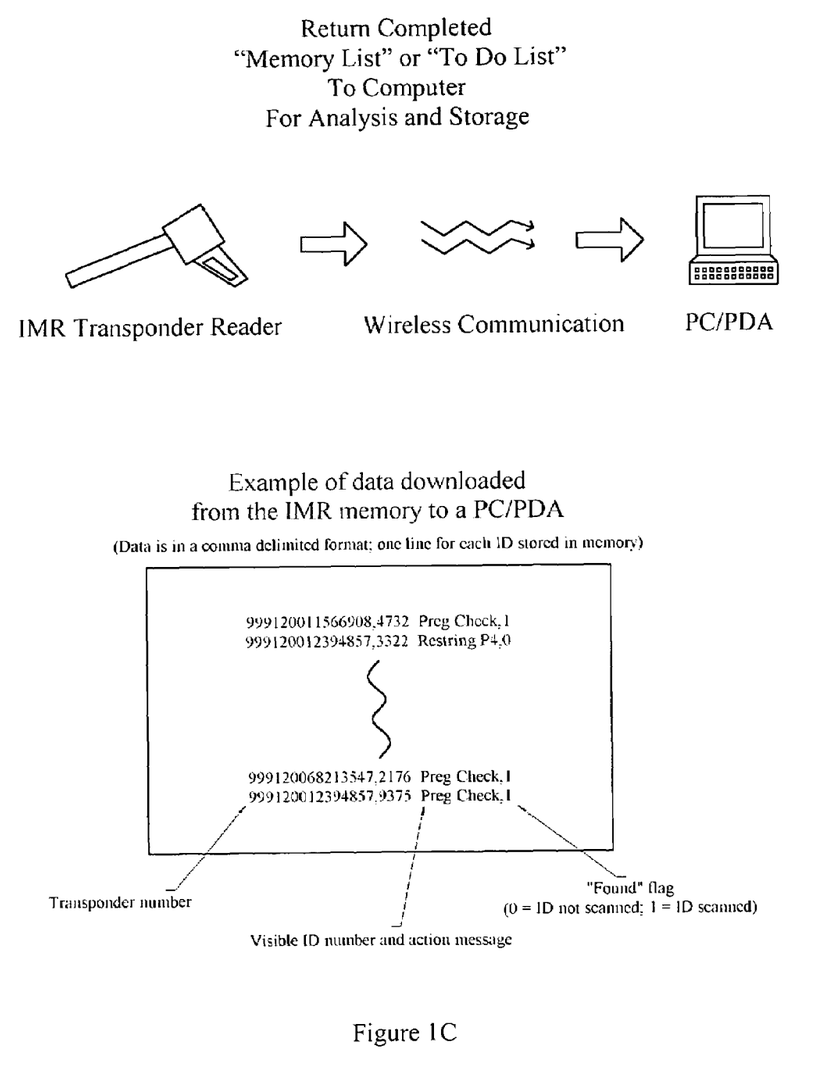
Figure 1D:
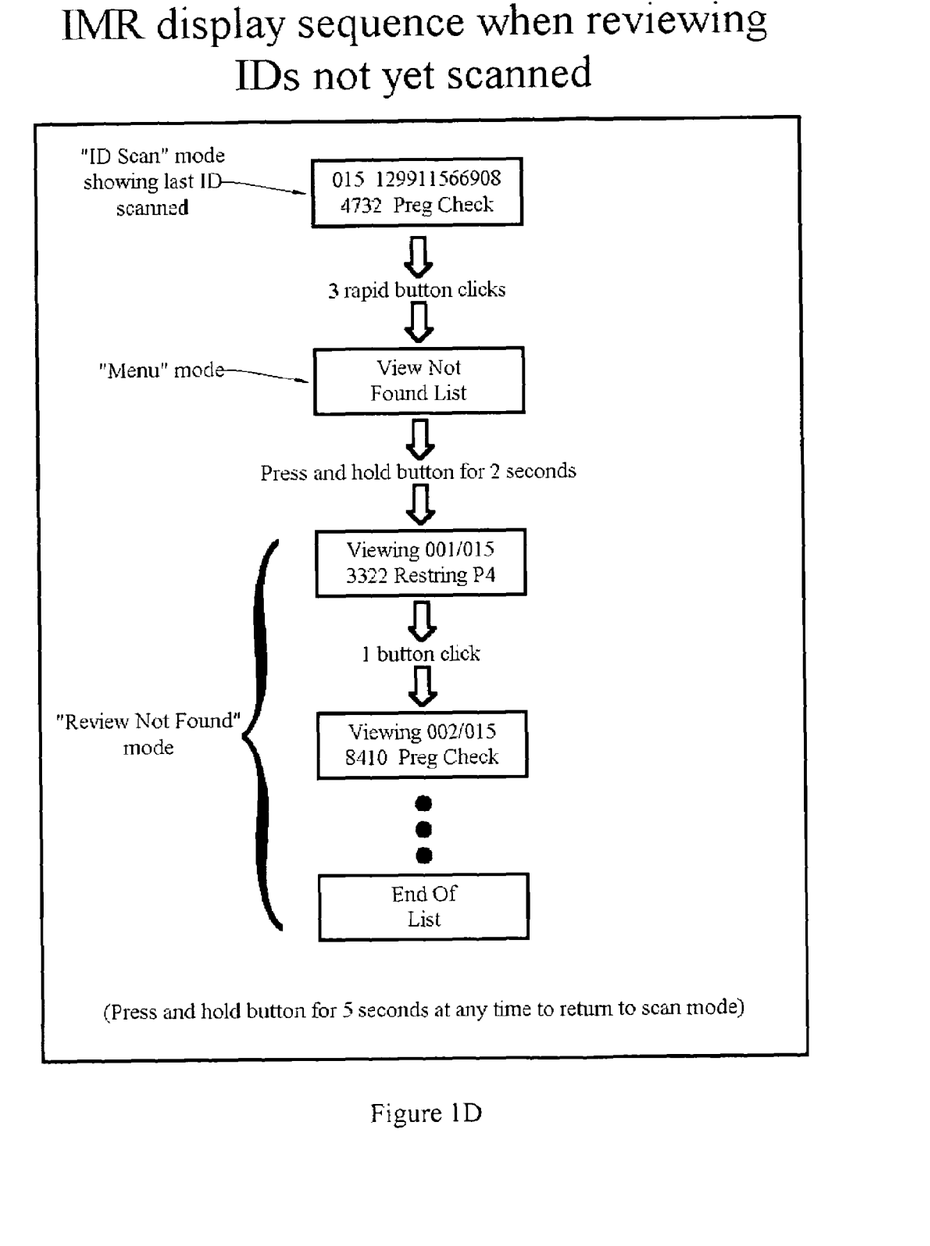
Figure 1E:
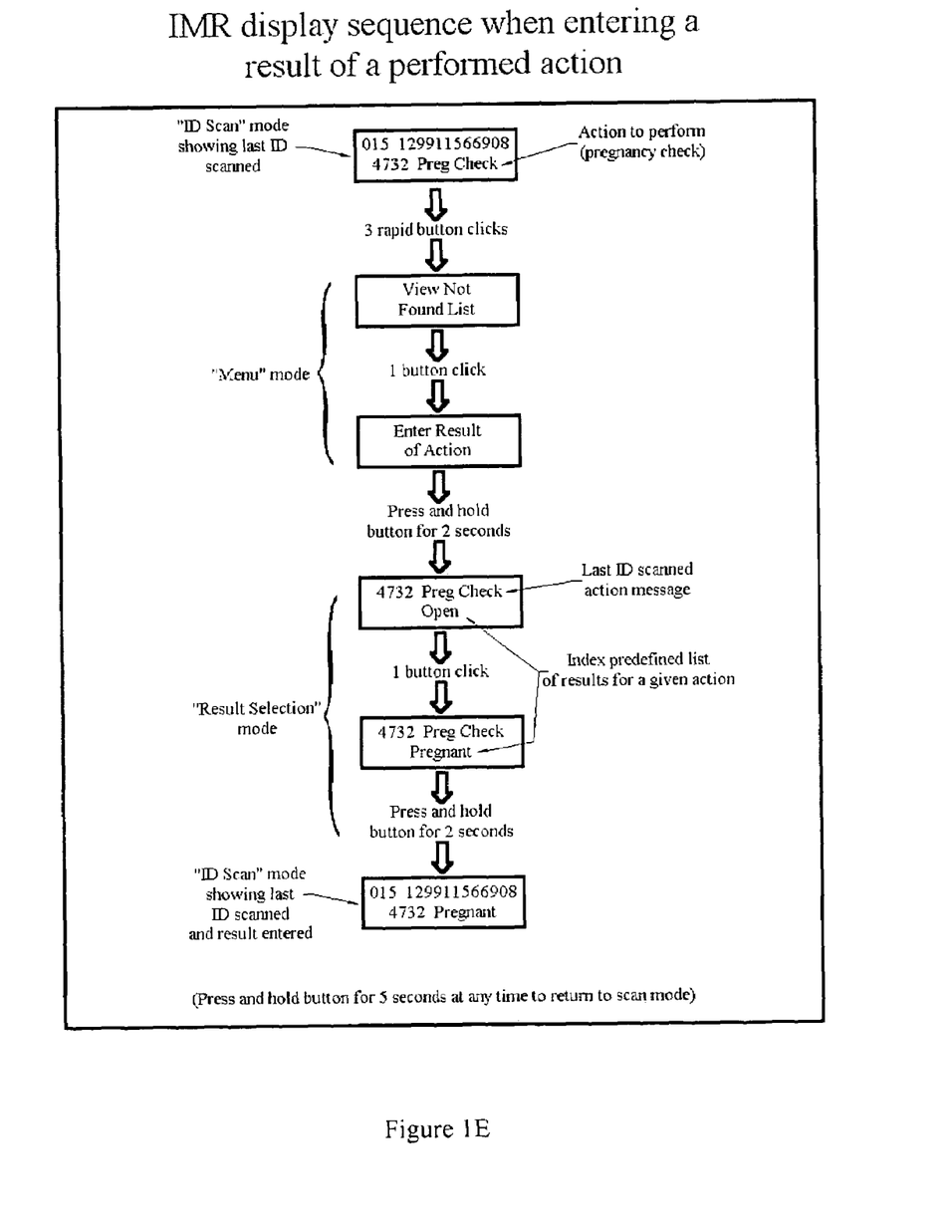

With attention to the system organization, display configuration and operation flow charts shown at FIGS. 1a-1e, the general functional operation of the IMR reader/writer is as follows:

1. An export is made from a computer database, which holds a "to do" list of animals that are to receive a specific service or a set of services defined for each RFID numbered animal.

2. The database list is transferred to the IMR via a suitable wired, wireless, RF or IR communications link.

3. The transferred list and other instructions and/or data is received by the IMR and stored on an integrated memory chip.

4. The IMR is then used to read a radio frequency identifying tag (RFID) on successive animals.

A) Many of the animal tags being read may not have been stored on the database list. For these animals, the reader will indicate only that they were read.

B) When each of the pre-designated animals on the list is read, the reader alerts the operator to the identification of a listed animal in a suitable manner (e.g. double beep, lighting a specific colored read light or vibration etc.) and brings up the preloaded information/instructions or protocol regarding each animal and displays this protocol on the LCD display.

i) Visible ID tag on the animal for cowside confirmation.

ii) Service to be provided to said animal or measurement to be taken.

iii) The count of animals to be located is diminished by one.

iv) The cow record is flagged for later verification as to which animals were located and received the service or on which animals' measurements were made.

v) RFID # may be displayed as well as the visible tag #.

5. When work is completed or substantially completed with the listed animals.

The count will be at or near zero on the "work to-do" count list.

6. Reestablish link between IMR and the computer database and transfer the original work list with the flag added for those animals that have been serviced or measured. Those animals on the list that have not been flagged will have to be separately located and identified to enable the operator to complete the task for all tasked animals.

7. The treatment, service or measurement may then be either keyed or directly uploaded to the original master database for those animals that have been serviced.

The foregoing operations enable the IMR to function in an isolated stand-alone mode without being simultaneously connected or linked to a computer or a network. An operator can perform tasks without ongoing supervisory input and still transfer the results of his activities back into the original database at a future point in time.

II. Operational Variations

Some possible operational variations for the IM Reader/Writer are as follows:

A. When no database exists and work is to be conducted based upon the RFFD identifier on the animal, the following protocol can be used:

1. The RFID tag affixed to the animal is scanned into the IMR.

2. Additional information may then be added to this new animal file. For example, if a weight is being taken, the scale head can be instructed to print the weight and the weight can be transmitted via the serial port. If the data is sent via a Bluetooth transmission, the BLUETOOTH connection on the IMR must be entered, which will be stored together with the RFID # just read into the IMR memory.

3. The same general sequence can be followed with other electronic measurements (e.g. an ultrasound device or a digital thermometer) using related, systematic instructions determined for an operating protocol peculiar to the instrument being monitored.

4. Inputs keyboarded from a computer can also be stored in the IMR memory.

B. When the database exists and the operator desires to associate certain bits of data with an animal already in the database, the following protocol can be used and wherein each of the steps stated above for normal operations through step I.4.B.iv) are again performed, then:

v) A signal is sent to the IMR, such as by very rapidly keying the read or power switch a set number of times or by scanning a status RFID tag (like in a barcode book of ID code keys) pertaining to a question or status, and the detected # or its translated value is placed onto the LCD display.

a) This facilitates a quick data input on the selected animal. (Yes—No), (Elevated Temp.—Normal Temp.), or (Preg.—Open—Cystic).

b) The Status tag or rapid keying can input other preset information into the IMR, including weights, measurements, market criteria, etc.

c) Rapid Keying or reading a Status Tag can also cue the IMR to list the visible tag numbers for those animals "not yet located" or "missing" near the end of the task session as a reminder to the operator. Not until the missing RFID numbers are scanned will they be flagged in the IMR.

d) Accessing the visible tag numbers while still in the field enables the operator to conduct a rapid visual search for the few animals that still need to be serviced.

5. A link between the IMR and the computer database is then reestablished and the original work list with the flag added and the status indication identifier, are transferred.

6. Now the list contains distinct groups of tags requiring further processing.

a) Animal tags with no flags (i.e. yet to be located and serviced);

b) Animal tags with flags indicating service completed; and c) Animal tags with flags, an accompanying status indicator and the data for the status.

III. Example Application—

Assume twenty designated animals in a string of 200 dairy cows from a herd of 2000 are to be given a vaccination. The list of twenty animals is moved to the Reader Integration Program from any herd management software package that may be in use to store individual cow records. This aligns the data format for loading onto the RFID reader. In certain situations, the action list may go direct from a herd management software database to the IMR. This file of animals will contain the individual RFID #'s, and possibly the visual ear tag numbers for positive cowside ID, and the action indicated to be performed.

When loaded into the IMR, the IMR is ready to locate and alert the operator when each of the selected twenty animals is found. Messages displayed at the LCD screen then instruct the operator what task is to be performed when the animal is located. As each animal on the list is read and identified and the task performed, the stored animal record may be given another character to designate that the task has been performed. If the IMR is linked wirelessly to a PDA, the list of serviced animals would appear in the PDA file.

If not linked, the list can be downloaded when it is completed and the unmarked animal files noted as not having been accomplished. The screen may also show a count of the animals to be given this vaccine or service. This count will automatically decrease toward zero as each animal on the list is located and will show the count of the animals not yet located.

The IMR, which is not linked, can also show a list of the animals yet to be serviced which enables the operator to locate the missed animals via their visual tag and thus complete the task prior to re-linking with a computer. To do this, the operator rapidly keys the button a set number of times that is different from when keying task entry's. This rapid keying brings up un-serviced animals with visible tag numbers and scrolls through them with each sequential click. Thus a visual tag cross-reference provides a final strategy for locating all animals to be serviced for each task.

By utilizing a memory chip in a unique fashion to collect and collate data along with prompting operator tasks to be performed and the data to be collected based on downloaded RFID numbers that are to be read into the memory, the IMR becomes a functional entity inherently different from other RFID systems which read and store tag numbers or send all information direct to a computer for processing and storage.

This approach utilizes the IMR memory, LCD display and indicator lights plus audio stimulation, as well as an operator protocol, to simplify and reduce the amount of equipment required on site in order to perform tasks and record observations or event completion. Thus when RFID reading, memory programming with interactive access, operator protocol, wireless communications and battery driven equipment are combined in a single device with minimal operator inputs it results in an effective non-cumbersome tool well suited to the needs of animal agriculture that can be operated at a remote site independently from a computer or PDA. The use of a PDA or computer linked to the RFID memory reader extends this basic utility, but these peripherals are not required for the IMR to be efficient and for the operator to function independently.

While the invention has been described with respect to several presently considered reader and system constructions and considered modifications and improvements thereto, it is to be appreciated that still other constructions may be suggested to those skilled in the art. The scope of the invention should therefore be construed broadly within the spirit and scope of the following claims.

What is claimed is:

1. A system for reading and writing animal husbandry data comprising:
    a) a database containing data peculiar to the identity and condition of a plurality of animals;
    b) a plurality of wireless transponders each mounted to an animal and containing identification data identifying a unique animal;
    c) a duplex wireless communications link;
    d) a system controller coupled to said database and said communications link for directing animal management activities and maintaining the data of said database;
    e) a handheld wireless reader having i) transmitter and receiver means coupled to said communications link for receiving data from each of said transponders and said system controller and transmitting collected reader data to said system controller and database, ii) an alphanumeric display, iii) an enunciator; iv) a memory containing data received from said system controller including a) identification data defining a list of animals, b) a plurality of predefined operator tasking instructions peculiar to each of the listed animals, and v) means responsive to the reading of a transponder of a listed animal for enunciating an alert to the operator and displaying the tasking instructions for the located animal on said alphanumeric display, and vi) means for writing operator entered task completion data to said memory.

2. A system as set forth in claim 1 wherein said transponder comprises a radio frequency responsive device containing identification data mounted to an animal.

3. A system as set forth in claim 1 wherein said reader includes means for transmitting said identification and task completion data for listed animals to said system controller and database.

4. A system as set forth in claim 1 wherein said reader includes means for storing and displaying data identifying each animal serviced.

5. A system as set forth in claim 1 wherein said reader includes means for storing and communicating data identifying each listed animal located, each listed animal serviced and any related servicing data.

6. A system as set forth in claim 1 wherein said enunciator produces tactile operator alerts.

7. A system for reading and writing animal husbandry data comprising:
    a) a database containing data peculiar to the identity and condition of a plurality of animals;
    b) a plurality of radio frequency transponders each mounted to an animal and containing identification data identifying a unique animal;
    c) a duplex radio frequency communications link;
    d) a system controller coupled to said database and said communications link for directing animal management activities and maintaining the data of said database;
    e) a handheld radio frequency reader having i) transmitter and receiver means coupled to said communications link for receiving data from each of said transponders and said system controller and transmitting collected data to said system controller and database, ii) an alphanumeric display, iii) an enunciator; iv) a programmable memory containing database data received from said system controller including a) identification data defining a list of animals, b) a plurality of predefined operator tasking instructions peculiar to each of the listed animals, and v) means responsive to the reading the transponder of a listed animal for providing a tactile alert to the operator and displaying the tasking instructions for the located animal on said alphanumeric display, and vi) means for writing operator entered task completion data to said programmable memory.

8. A system as set forth in claim 7 wherein said reader includes means for transmitting said identification and task completion data for listed animals to said system controller and database.

9. A system as set forth in claim 7 wherein said reader includes means for storing and displaying data identifying each animal serviced.

10. A system as set forth in claim 7 wherein said reader includes means for storing and communicating data identifying each listed animal located, each listed animal serviced and any related servicing data.

11. A method for managing a collection of animals and related animal husbandry data comprising:
    a) programming a list of identification data and a plurality of predefined operator tasking instructions peculiar to each of a plurality of identifiable animals tracked in a database via a full duplex wireless communications link to a handheld wireless reader, wherein said reader comprises i) transmitter and receiver means coupled to said communications link, ii) an alphanumeric display, iii) an enunciator; iv) a programmable memory for storing a) identification data defining a list of animals, b) a plurality of predefined operator tasking instructions peculiar to each of the listed animals, and c) task completion data;
    b) reading identification data via said handheld reader from each of a plurality of wireless transponders individually mounted to a group of animals;

c) comparing the read identification data read to the stored identification data to locate each listed animal;

d) alerting an operator carrying the handheld reader to the locating of a listed animal via an enunciator;

e) displaying the stored tasking instructions for each listed animal as the listed animal is located;

f) storing task completion data entered by said operator into the programmable memory; and g) communicating the identification and task completion data for listed animals to a system controller for updating said database.

12. A method as set forth in claim 11 wherein said enunciator comprises a tactile enunciator.

13. A method as set forth in claim 11 wherein said wireless communications link and said transponders operate at a radio frequency.

14. A method as set forth in claim 11 including the step of storing and displaying data identifying each animal located.

15. A method as set forth in claim 11 including the steps of storing and communicating data identifying each listed animal located, each listed animal serviced and any related servicing data.

* * * * *